Patented June 2, 1925.

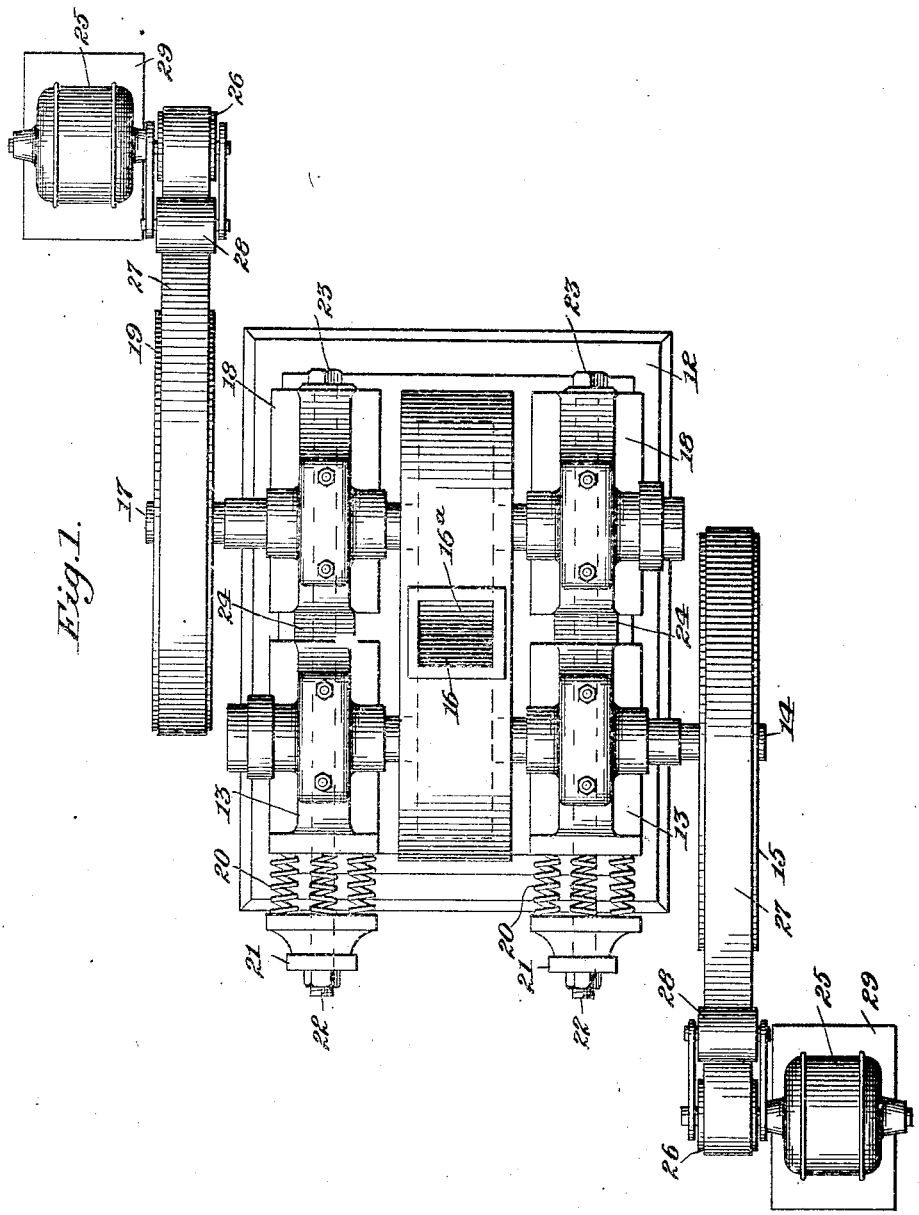

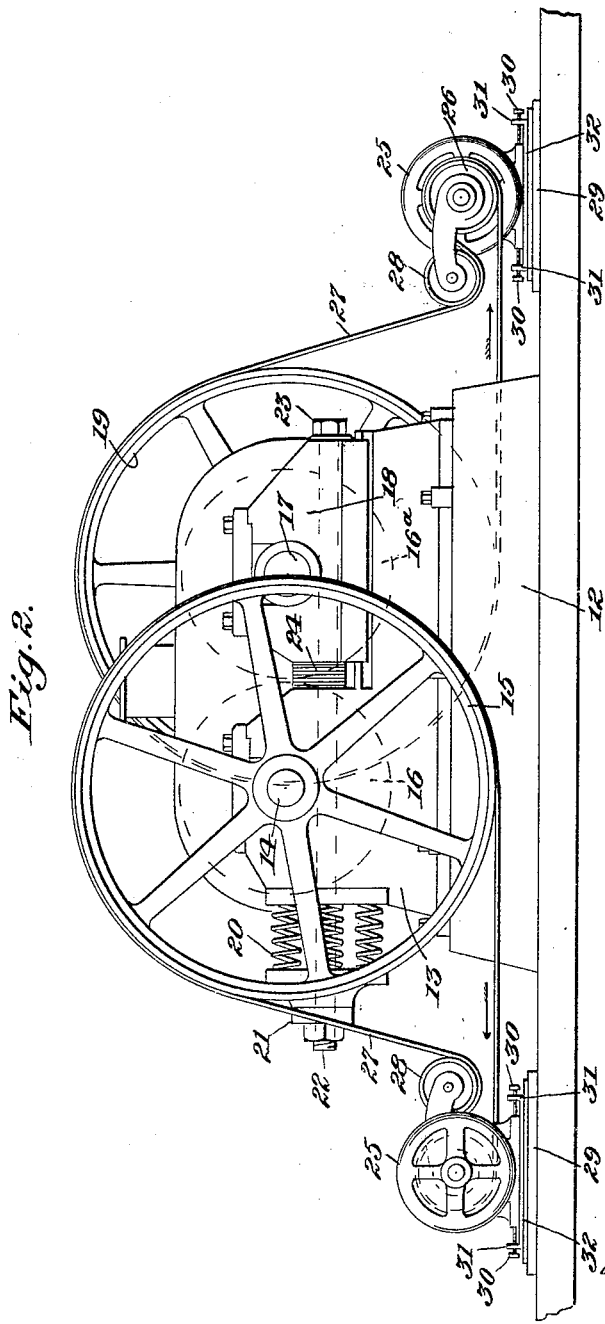

1,539,948

UNITED STATES PATENT OFFICE.

ALEXANDER GRANT McGREGOR, OF WARREN, ARIZONA.

DRIVING SYSTEM FOR ROLL-CRUSHING MACHINES.

Application filed May 13, 1924. Serial No. 713,039.

*To all whom it may concern:*

Be it known that I, ALEXANDER GRANT McGREGOR, a citizen of the United States, residing at Warren, in the county of Cochise and State of Arizona, have invented or discovered certain new and useful Improvements in Driving Systems for Roll-Crushing Machines, of which the following is a specification, reference being had therein to the accompanying drawings.

In that class of power driven roller crushing machines in which the shaft for one roll is mounted in fixed bearings and the shaft for the other roll is mounted on yielding bearings, so that one of the crushing rolls can move away from the other when any unusually hard substance or article gets between said rolls, the two shafts have usually been driven by belts driven from pulleys on a power or "jack" shaft which is on that side of the machine at which the movable crushing roll is located, one of these belts being a crossed belt to give the proper direction of rotation to the shaft (usually the yieldingly mounted shaft) with which the said crossed belt is connected. The crossed belt running to the movably mounted roll pulley is generally somewhat slack so that most of the power is transmitted to the machine by the belt running to the pulley on the shaft which is journalled in fixed bearings. When the movably mounted roll is forced away from the other roll the tension on the belt of the movably mounted roll is relaxed so that still less power is transmitted to the said movably mounted roll. In thus driving the crushing rolls the tight side of the belt transmitting most of the power is on top. As the crushing rolls wear down, in use, the space between the crushing faces is maintained approximately constant by removing shims which permits the movable roll shaft to occupy a position closer to the fixed roll shaft and farther away from the jack shaft driving it. To accommodate the subsequent adjustments the belt driving the movable roll must be sufficiently slack in the first place.

Sometimes a belt drive for the movable roll is omitted altogether, said roll deriving its rotating motion indirectly from the "fixed" roll through the ribbon of material passing between the two roll faces.

The objections to these systems of driving are: (*a*) The tight side of the belt driving the pulley on the rigid roll is on top. This condition is bad for a belt drive, resulting in faster wear and requires that the belt be taken up oftener than would be necessary if the tight side were on the bottom. This also makes a bad condition for the bearings of the jack shaft causing extra pressure on them, requiring close attention on the part of the attendant, and resulting in more wear on the bearings. (*b*) As suggested, the belt driving the rigid roll must be fairly taut at all times. There is always a certain amount of slack in the bearings of the rigid roll so that when feed to the roll slacks off the drive belt tension tends to draw the rigid roll in toward the movable roll. Then when the feed comes on again the rigid roll shaft is forced back again against the back of its bearings with a slam. With an intermittent feed this condition causes a disagreeable and more or less harmful hammering.

(*c*) Practically all the power is delivered through the fixed roll with the result that the steel shell of this roll wears down faster than the shell on the movable roll. As it is more expeditious to make one repair job and change both shells at the same time, the shell on the movable roll is often discarded before it is worn out.

These objections are overcome by an improved power driving system which is illustrated in the accompanying drawing in which Fig. 1 is a plan view and Fig. 2 a side view of a roll crushing machine and the improved driving system therefor.

Referring to the drawing, 12 denotes a base on which are mounted fixed bearings 13 for a shaft 14 to which is fixed a driving pulley 15 and a crushing roll 16. Co-operating with said crushing roll 16 is a companion crushing roll 16ª fixed to a shaft 17 mounted in yielding bearings 18 adapted to slide back and forth on a fixed support, said shaft 17 carrying a driving pulley 19. The crushing roll 16ª is forced toward its companion crushing roll 16 by springs 20 placed between the fixed bearings 13 and movable heads 21, said springs encircling bolts 22, the heads 23 of which bolts are in contact with the yielding bearings 18. Between the fixed and yielding bearings are interposed shims 24.

The driving pulleys 15 and 19 are preferably independently driven by motors 25 the shafts of which carry power pulleys 26 connected by belts 27 with the driving pulleys 15 and 19, the slack of said belts being taken up by belt tighteners 28. These driving belts are so arranged that the tight sides thereof are on the bottoms of the said pulleys, as indicated in Fig. 2, so that the slack of said belts increases their arc of contact on the driving and driven pulleys, which is the ideal condition sought for by those experienced in power transmission by belts. Also the pull on said belts is in opposite directions and tends to draw the yieldingly mounted roll away from the other roll and to hold the yieldingly mounted roll shaft back in its bearings regardless of whether the rolls are crushing anything or not.

With the power transmitted through the bottom runs of the belts, so that the arcs of contact of the belts with the driving pulleys 15 and 19 are larger than they otherwise would be, less tension on the belts is required. Thus the tensile strain on the belts will be less and their life lengthened, and the wear on the bearings for the shafts 14 and 15 will be less, in that they will not be crowded towards each other so much.

The motors 25 are mounted on base plates 29 and are held in any desired position on said base plates by screws 30 passing through lugs 31 on the bases 32 of the motors, so that the said motors may be adjusted toward and from the pulleys 15 and 19 for the purpose of allowing the belt tighteners 28 to operate always in a low position and thus maintain a maximum arc of contact by the belts on their pulleys even in the case of the movable roll when the roll shells are nearly worn out and all the shims are removed.

From the foregoing it will be understood that the crushing rolls are independently driven by separate motors arranged on opposite sides of the machine, so that equal power may be transmitted to the pulleys connected with the shafts on which the crushing rolls are mounted, and the wear on said crushing rolls will therefore be even, and the disadvantage of discarding shells that are not entirely worn out, hereinbefore referred to, will be avoided.

Although I prefer to drive the pulleys 15 and 19 by separate motors, as above described, this is not positively necessary as power pulleys located on opposite sides of the crushing machine as are the power pulleys 26 of the motors 25, but operated from a common source of power, might be employed without departing from my invention.

Also it will be apparent that by making the pulleys on the roll shafts smaller in diameter than those herein shown, and by making one shaft longer than the other, so that the driving pulleys on said shaft would be offset from each other, the two machine driving pulleys and their respective power pulleys or motors could be located at the same end of the machine. Such an arrangement would not, of course, depart from the spirit of my invention.

Having thus described my invention, I claim and desire to secure by Letters Patent:

1. In a roll crushing machine, the combination with two shafts each provided with a driving pulley and a crushing roll, one of said shafts being mounted in spring-pressed bearings, of two power pulleys located some distance apart and on opposite sides of the said machine and of said shafts, and driving belts connecting said power pulleys and driving pulleys and arranged to pull on one of said driving pulleys in opposition to the stress of the springs for said spring-pressed bearings.

2. In a roll crushing machine, the combination with two shafts each provided with a driving pulley and a crushing roll, one of said shafts being mounted in yielding bearings, of two power pulleys located some distance apart and on opposite sides of the said machine and of said shafts, and driving belts connecting said power pulleys and driving pulleys, each of said power pulleys being arranged to drive the driving pulley nearest to it, so that the tension on one of said belts will tend to draw the said rolls apart in opposition to the stress of the springs for the yielding bearings.

3. In a roll crushing machine, the combination with two shafts each provided with a driving pulley and a crushing roll, one of said shafts being mounted in spring-pressed bearings, of two power pulleys located some distance apart and on opposite sides of the said machine and of said shafts, and driving belts connecting said power pulleys and driving pulleys, each of said power pulleys being arranged to drive the driving pulley nearest to it, with its tension on one of said pulleys in opposition to the stress of the springs acting on said spring-pressed bearings, the direction of rotation of said power pulleys being such that the upper runs of said belts will be slack and the bottom runs tight, so as to transmit power through said bottom runs.

4. In a roll crushing machine, a system for driving the crushing rolls comprising two power pulleys, one each on opposite sides of the center line between the two shafts of said crushing rolls, one of said shafts being mounted in yielding bearings, driving pulleys on said shafts, the top sides of each of said driving pulleys turning inwardly, belts connecting said power pulleys and driving pulleys, each power pulley operating the driving pulley on the roll shaft nearest to each of said respective power pulleys, so that the top runs of said belts will be slack and the bottom runs will be tight, and so that the power will be transmitted through the said bottom runs.

5. In a roll crushing machine, the combination with fixed and yielding bearings, of two shafts one of which is journalled in said fixed bearings and the other of which is journalled in said yielding bearings, a driving pulley and a crushing roll fixed to each of said shafts, two motors arranged on opposite sides of said machine and having power pulleys, and two driving belts independently connecting said power pulleys with said driving pulleys on the roll-carrying shafts, the tension on one of said belts being in opposition to the stress of the springs acting on said yielding bearing.

6. In a roll crushing machine, the combination with fixed and yielding bearings, of two shafts one of which is journalled in said fixed bearings and the other of which is journalled in said yielding bearings, a driving pulley and a crushing roll fixed to each of said shafts, two motors arranged on opposite sides of said machine and having power pulleys, two driving belts independently connecting said power pulleys with said driving pulleys on the roll-carrying shafts, the tension on one of said belts being in opposition to the stress of the springs acting on said yielding bearing, and a belt tightener for each of said belts.

7. In a roll crushing machine, the combination with fixed and yielding bearings, of two shafts one of which is journalled in said fixed bearings and the other of which is journalled in said yielding bearings, a driving pulley and a crushing roll fixed to each of said shafts, two motors arranged on opposite sides of said machine and having power pulleys and two driving belts connecting said power pulleys with said driving pulleys on the roll-carrying shafts, the direction of rotation of the motor shafts being such as to cause the tight sides of said belts to run from the bottoms of said last-named pulleys so that the power is transmitted by the bottom runs of said belts, and the tension on one of said belts being in opposition to the stress of the springs acting on said yielding bearing.

8. In a roll crushing machine, the combination with fixed and yielding bearings, of two shafts one of which is journalled in said fixed bearings and the other of which is journalled in said yielding bearings, a driving pulley and a crushing roll fixed to each of said shafts, two motors, having power pulleys, and two driving belts independently connecting said power pulleys with said driving pulleys on the roll-carrying shafts, said motors being adjustably mounted on their bases, so that their positions towards and from said machine may be varied to vary or take up the slack of said belts, and the tension on one of said belts being in opposition to the stress of the springs acting on said yielding bearings.

9. In a roll crushing machine, a system for driving crushing rolls consisting of two power pulleys arranged on opposite sides of the center line between the two shafts of said crushing rolls, driving pulleys on said shafts, the top side of each of said driving pulleys turning in an inward direction, each power pulley driving the belt pulley on the roll shaft nearest to each of said respective power pulleys, so that the top runs of both of said belts will be slack and the bottom runs will be tight, with the result that the belt tension of the two drives will tend to keep the rolls apart and the shafts back against their respective bearings.

In testimony whereof I affix my signature.

ALEXANDER GRANT McGREGOR.